Patented Oct. 14, 1924.

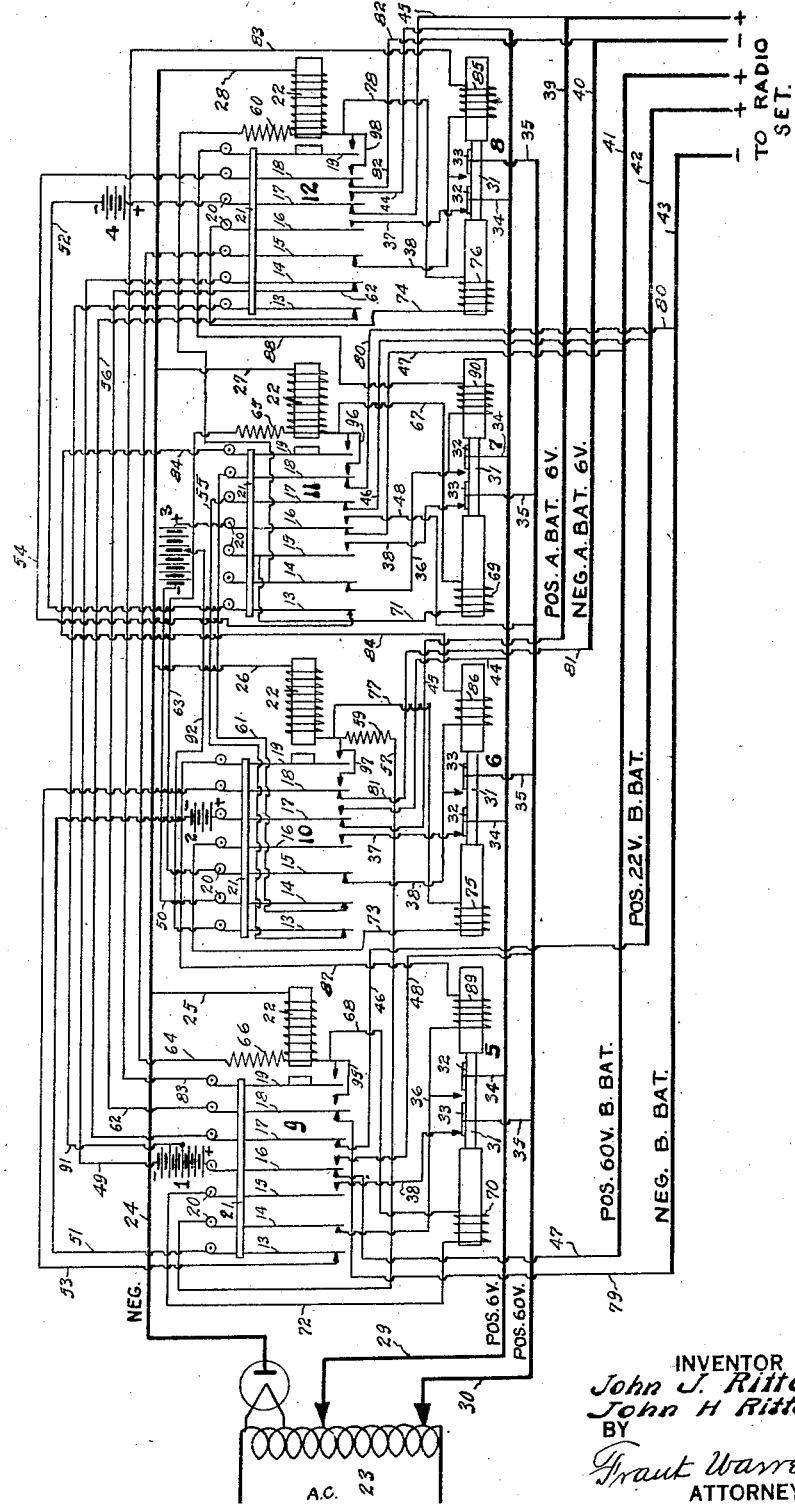

1,511,581

UNITED STATES PATENT OFFICE.

JOHN J. RITTER AND JOHN H. RITTER, OF SEATTLE, WASHINGTON.

AUTOMATIC BATTERY-CHARGING APPARATUS.

Application filed June 26, 1923. Serial No. 647,838.

*To all whom it may concern:*

Be it known that we, JOHN J. RITTER and JOHN H. RITTER, citizens of the United States, residing at Seattle, in the county of King and State of Washington, have invented a certain new and useful Improvement in Automatic Battery-Charging Apparatus, of which the following is a specification.

Our invention relates to improvements in automatic battery charging apparatus and an object of our invention is to provide automatic means for alternately connecting any number of storage batteries with charging and discharging circuits so that the batteries will be alternately and successively switched from one circuit to another, the automatic devices operating, as soon as a battery on the charging circuit is charged up to a predetermined voltage to switch said battery onto the discharge circuit and to switch a discharged or partially discharged battery onto the charging circuit.

Another object of the invention is to provide devices of this nature that are especially adapted for use in connection with radio telegraph or telephone communication systems, and that make possible the use of batteries of relatively low capacity and cheap cost in work where a substantially constant potential is desired.

In radio telephone and telegraph communication systems two types of batteries, one a low and the other a higher voltage battery are commonly used. These batteries are ordinarily relatively high capacity batteries and are somewhat expensive. This system makes possible the substitution of two or more batteries of the most cheap and simple construction for each of the more expensive batteries ordinarily used. This system effects a further saving by doing away with the necessity of having two sets of expensive batteries of the usual type as is often done in sets that are operated a great deal, one set of such batteries being in use while the other set is being charged.

In the drawings the figure is a diagram of apparatus constructed in accordance with our invention.

Referring to the drawings we have shown, diagrammatically, four batteries 1, 2, 3 and 4 which may be of very cheap and simple construction, two of which, namely, batteries 2 and 4, may correspond to the commonly used low voltage batteries known as the "A" type and the other two of which, namely, batteries 1 and 3, may correspond to the commonly used higher voltage batteries known as the "B" type.

Each battery is associated with a compound solenoid and a circuit making and breaking relay said compound solenoids being designated generally by the numerals 5, 6, 7 and 8 and said relays being designated generally by the numerals 9, 10, 11 and 12. Each set of circuit making and breaking relays consists of a plurality of armatures 13, 14, 15, 16, 17, 18, and 19 all independently pivoted as at 20, all connected together for simultaneous operation, as by a bar 21 of insulating material, all urged in one direction as by springs, not shown, and all being arranged to be moved in the opposite direction as by electromagnets 22.

The several parts above mentioned may be interconnected between a radio set not shown and a combined rectifier and transformer 23 so that current from the rectifier and transformer 23 will be used to charge the batteries 1, 2, 3 and 4 and current from said batteries will be supplied to the radio set. In the drawings the primary circuits connected with the radio set and rectifier 23 are shown by heavy lines and the secondary circuits are shown by lighter lines.

Negative terminal of rectifier 23 is connected by main circuit wire 24 and secondary circuit wires 25, 26, 27 and 28 with each of the electromagnets 22. Positive terminal of rectifier 23 is connected with main circuit wire 29 for delivery of six volt current and with main circuit wire 30 for delivery of sixty volt current.

The compound solenoids are each made up of two solenoid members having their movable elements connected as by a bar 31 of insulating material upon which are secured two separate contact members 32 and 33. Contacts 32 are each connected by wires 34 with primary six volt circuit wire 29 and contacts 33 are each connected by wires 35 with primary sixty volt circuit wire 30. Contacts 32 are adapted to be connected by wires 36 with armatures 14 of relays 9 and 11, and by wires 37 with armatures 16 of relays 10 and 12, the position of the above mentioned armatures determining whether or not the contacts are made. Contacts 33 are adapted to be connected by wires 38 with armatures 15 of each relay 9, 10, 11 and 12, the position of the armatures, in this instance also, determining whether these circuits will be open or closed.

This apparatus may be connected to the radio set by five main circuit wires 39, 40, 41, 42 and 43, the same being connections to the various terminals of the batteries as designated on the drawings.

The armatures 17 of the relays 10 and 12 are arranged to be connected either with the main positive six volt circuit wire 29 by wires 44 or with the main positive six volt circuit wire 39 by wires 45. Armatures 17 of relays 9 and 11 are adapted to be connected by wires 46 to main positive twenty two volt circuit wire 42. Armatures 16 of relays 9 and 11 are adapted to be connected either by wires 47 with positive sixty volt main circuit wire 41 to radio set or by wires 48 with positive 60 volt wire 30 to rectifier 23.

Positive terminals of batteries 1 and 3 are connected with respective armatures 16 of relays 9 and 11 and negative terminals of batteries 1 and 3 are connected by wires 49 and 50 with respective armatures 14 of relays 12 and 10. Positive terminals of batteries 2 and 4 are connected with respective armatures 17 of relays 10 and 12 and negative terminals of batteries 2 and 4 are connected by respective wires 51 and 52 with armatures 13 of relays 9 and 11. Armatures 13 of relays 9 and 11 are adapted to be connected by respective wires 53 and 54 with respective armatures 18 of relays 10 and 12. Armatures 13 of relays 10 and 12 are arranged to be connected by respective wires 55 and 56 with respective armatures 17 of relays 9 and 11. Armatures 14 of relays 9 and 11 are arranged to be connected by respective wires 57 and 58 through respective resistances 59 and 60 and respective electromagnets 22 of relay sets 10 and 12 through conductors 26 and 28 to negative circuit wire 24. Armatures 14 of relays 10 and 12 are arranged to be connected by respective wires 61 and 62 with armatures 18 of relays 11 and 9 respectively. Armatures 15 of relays 10 and 12 are connected by respective wires 63 and 64 through respective resistances 65 and 66 thru the winding of magnet 22 of relays 9 and 11, thence by means of conductors 27 and 25 to the primary conductor 24 of the charging circuit.

Armatures 16 of relays 10 and 12 are connected by respective wires 73 and 74, respective windings 75 and 76 of solenoids 6 and 8 and respective wires 77 and 78, through magnets 22 of relays 10 and 12 and conductors 26 and 28 to primary conductor 24 of charging circuit. Armatures 18 of relay sets 9 and 11 are arranged to be connected either with respective wires 95 and 96 through electromagnets 22 of relays 9 and 11, wires 25 and 27 to wire 24 of primary charging circuit or by wire 79 and 80 to wire 43 of primary discharge circuit.

Armatures 18 of relay sets 10 and 12 are arranged to be connected to primary charging circuit wire 24 by means of wires 97 and 98 through electromagnets 22 of relays 10 and 12 and wires 26 and 28 or by wires 81 and 82 to primary discharging circuit wire 40.

Armatures 19 of relay sets 9 and 11 are arranged to be connected to primary charging circuit wire 24 by means of wires 25 and 27 through electromagnets 22 of relays 9 and 11.

Armatures 19 of relay sets 10 and 12 are arranged to be connected to primary charging circuit 24 by means of wires 26 and 28 through electromagnets 22 of relays 10 and 12.

Circuit wires 91 and 92 connect respective batteries 1 and 3 to armatures 13 of respective relay sets 12 and 10 thereby completing the connection to the main twenty two volt circuit wire 42 of the radio set.

In the diagram shown in the drawing the batteries 1, 2, 3 and 4 are all connected with the discharging circuit or radio set, the connections being as follows beginning with the negative circuit wire of the main discharge circuits:

For battery 1:—circuit wires 43, 79, armature 18 of relay 9, circuit wire 62, armature 14 of relay 12, wire 49, battery 1, armature 16 of relay 19 and wire 47 to main discharge circuit wire 41.

For battery 2:—circuit wires 40 and 83, armature 18 of relay 10, wire 53, armature 13 of relay 9, wire 51, battery 2, armature 17 of relay 10, and wire 45 to main discharge circuit wire 39.

For battery 3:—wires 43 and 80, armature 18 of relay 11, wire 61, armature 14 of relay 10, wire 50 battery 3, armature 16 of relay 11 and wire 47 to main discharge circuit wire 41.

For battery 4:—wires 40 and 82, armature 18 of relay 12, wire 54, armature 13 of relay 11, wire 52, battery 4, armature 17 of relay 12 and wire 45 to main discharge circuit wire 39.

When the batteries are all on discharge as above set forth the solenoids 5, 6, 7 and 8 will all be unoperative and the circuits thereto will be broken and in order to start the device to functioning one of the relays may be operated manually.

Assume that relay 9 is moved to the opposite position from that shown in the drawing then the discharging circuit hereinbefore described, to battery 1, through armature 18 of relay 9 will be broken and a charging circuit between battery 1 and rectifier 23 will be closed as follows: rectifier 23, wire 30, wire 48, armature 16 of relay 9, battery 1, wire 49, armature 14 of relay 12, wire 62, armature 18 of relay 9, wire 95, electromagnet 22 of relay 9 wire 25 and wire 24 back to rectifier 23. Simultaneously with the closing of the circuit just described another circuit from rectifier 23 including wires 30, 35, 33, 38, armature 15 of relay 9, wire 72, coil 70 of electromagnet 5, wire 68 coil 22 of electromagnet 9 and wires 25 and 24 back to rectifier 23 will be momentarily closed energizing coil 70 which moves compound solenoid 5 to the left breaking contact between wire 38 and contactor 33 and closing contact between wire 36 and contact 32, the circuit through contactor 32 being open at this time by reason of armature 14 of solenoid 9 moved away from contact by which it is arranged to be electrically connected with wire 36.

As the voltage of battery 1 in charging approaches the voltage of the main charging line with which it is connected less current flows through the electromagnet 22 of relay 9 and the attraction of said electromagnet grows less, and, eventually, when the voltage of battery 1 reaches a predetermined maxmum, solenoid 22 releases armatures 13 to 19 inclusive and permits them to drop or be moved back into the position shown in the drawings thereby breaking the previously described charging circuit and again closing the discharging circuit to wires 43 and 41. The armatures of each relay are preferably yieldingly held away from the several electromagnets 22 as by springs, not shown, the strength of which will determine the time of release in the charging of a battery.

When electromagnet 22 of relay 9 releases after charging battery 1 and the armatures of said relay move back to the position shown in the drawings, the compound solenoid 5 having previously been moved to the left leaving contactor 32 closed and contactor 33 open, a momentary circuit to operate relays 10 and break the discharging and close the charging circuit to battery 2 as follows; from rectifier 23 through wires 29, 34, contactor 32, wire 36, armature 14 of relay 9 wire 57, resistance 59, winding of electromagnet 22 of relay 10, wire 26 and wire 24 to rectifier 23. The energizing of electromagnet 22 causes the solenoids of relay 10 to be moved to the right and charging circuit to battery 2 from rectifier 23 to be closed through wires 29 and 44, armature 17 of relay 10, battery 2, wire 51, armature 13 of relay 9, wire 53, armature 18 of relay 10 wire 97 coil of electromagnet 22 of relay 10 wire 26 and wire 24 to rectifier. Simultaneously with the operation of the above circuits to relay 10 the following circuit is closed momentarily: from rectifier 23 through wires 29 and 34, contactor 32 of solenoid 5, wire 36, coil 89, wire 87 armature 19 of relay 10, electromagnet coil 22 of relay 10 wire 26 and wire 24 to rectifier 23, thus energizing coil 89 and moving compound solenoid 5 to the right from the previously described position into the position shown in the drawings. At the same time that battery 2 is placed on the charging circuit compound solenoid 6 is moved to the left by energizing coil 75 as follows: from rectifier 23 through wires 29 and 34, contactor 32 of solenoid 6, wire 37, armature 16 of relay 10 wire 73 coil 75 wire 77 electromagnet coil 22 of relay 10 wire 26 and wire 24 back to rectifier 23, thus closing contact of contactor 33 and breaking contact of contactor 32 of solenoid 6.

When battery 2 is charged to a predetermined voltage electromagnet 22 of relay 10 releases and the armatures of said relay 10 are moved back into the position shown in the drawing thus breaking the charging circuit and closing the discharging circuit previously traced out. This movement of the armatures of relay 10 to the left energizes electromagnet 22 of relay 11 by closing a circuit from rectifier 23 through wires 30 and 35, contactor 33, of compound solenoid 6, wire 38, armature 15 of relay 10, wire 63, resistance 65, electromagnet coil 22 of relay 11, wire 27 and wire 24 to rectifier thus causing electromagnet 22 of relay 11 to move the armatures of relay 11 to the right, breaking the discharging circuit to battery 3 and closing the charging circuit to the same as follows: from rectifier 23 through wires 30 and 48, armature 16 of relay set 11, battery 3, wire 50, armature 14 of relay set 10 wire 61, armature 18 of relay set 11, wire 96, electromagnet 22 of relay set 11, wire 27 and wire 24 to rectifier. Simultaneously with the above operations the following two circuits are closed; first, from rectifier 23 through wires 30 and 35, contactor 33 of solenoid 6 coil 86, wire 84, armature 19 of relay 11, electromagnet 22 of relay 11, wire 27 and wire 24 to rectifier 23, thus moving solenoid 6 to the right; second, from rectifier 23 through wires 30 and 35, contactor 33 of solenoid 7, wire 38, armature 15 of relay set 11, wire 71, coil 69, wire 67 electromagnet 22 of relay 11, wire 27 and wire 24 to rectifier 23, thus moving solenoid 7 to the left into a set position for operation when battery 3 ceases charging and is switched onto discharge.

When battery 3 is fully charged electromagnet 22 of relay set 11 releases breaking charging circuit and closing discharging circuit of battery 3. This operation closes electromagnet circuit 23, 29, 34 contactor 32 of solenoid 7 wire 36, armature 14 of relay 11 wire 58 resistance 60 electromagnet 22 of relay 12 wires 28 and 24 to rectifier 23, thus causing electromagnet 22 to move armature of relay 12 to right breaking discharging and closing charging circuit of battery 4 as follows: from rectifier 23 through wires 29 and 44, armature 17 of relay 12, battery 4, wire 52, armature 13 of relay 11, wire 54, armature 18 of relay 12, wire 98, electromagnet coil 22 of relay 12, and wires 28 and 24 to rectifier 23. Movement of armatures of relay 12 to right also closes circuit from 23 through wires 29 and 34, contactor 32 of solenoid 7, coil 90, wire 88, armature 19 of relay 12, electromagnet coil 22 of relay 12, wire 28 and wire 24 rectifier 23, moving solenoid 7 to right.

Movement of armatures of relay 12 to right also closes circuits from rectifier 23 through wires 29 and 34, contactor 32 of solenoid 8, wire 37, armature 16 of relay 12, wire 74, coil 76 wire 78 electromagnet 22 of relay 12, wire 28 and wire 24 to rectifier 23 moving solenoid 8 to left in position for next circuit shifting move.

When battery 4 is charged electromagnet 22 of relay 12 releases and armatures of said relay 12 are moved to the left breaking charging circuit and closing discharging circuit of battery 4 and at the same time energizing electromagnet coil 22 of relay 9 to break discharging and close charging circuit of battery 1 as follows: from rectifier 23 through wires 30 and 35, contactor 33 of solenoid 8, wire 38, armature 15 of relay 12, wire 64 resistance 66, electromagnet 22 of relay 9, wire 25 and wire 24 to rectifier 23. Also simultaneously with the closing of the above described another circuit is closed as follows: from rectifier 23 through wires 30 and 35, contactor 33 of solenoid 8, wire 38 coil 85, wire 83, armature 19 of relay 9, electromagnet coil 22 of relay 9, wire 25 and wire 24 to rectifier 23.

The opening and closing of the several circuits hereinbefore described constitute a complete cycle of operation of this battery charging system, which cycle is repeated as frequently as is necessary to meet the requirements under which the batteries are operating the operation being continuous after it is once started, the action of the electromagnetic control, when a battery is fully charged, switching such battery from the charging onto the discharging circuit and conversely switching the next succeeding battery from the discharging onto the charging circuit.

This apparatus is shown as applied to radio receiving devices and is arranged to make use of two A and two B type batteries but it will be understood that the invention may be applied to any battery charging system in which it is desired to place two or more batteries alternately on charging and discharging circuits.

It will be understood that with this type of apparatus batteries of very simple and cheap construction may be made to operate satisfactorily and to deliver current of substantially constant potential.

The foregoing description and accompanying drawings clearly disclose what we now consider to be a preferred embodiment of our invention but it will be understood that this disclosure is merely illustrative and that such changes may be resorted to as are within the scope and spirit of the following claims.

What we claim is:

1. In a battery charging system a charging circuit, a discharging circuit, a plurality of batteries, a relay set for each of said batteries, an electromagnet in each relay set for closing the charging circuit to the battery in said set, said electromagnet being connected in the charging circuit with said battery and means for momentarily energizing said electromagnet before the charging circuit to said battery is closed.

2. In a battery charging system a charging circuit, a discharging circuit, a plurality of batteries, a relay set for each of said batteries, said relay sets being arranged to normally connect said batteries with said discharging circuits, an electromagnet in each relay set for disconnecting the battery of said set from the discharging circuit and connecting said battery of said set with the charging circuit, said electromagnet forming a part of the charging circuit of the battery of the relay set, and means independent of the charging circuit to the battery of the set for energizing said electromagnet.

3. In a battery charging system, a charging circuit, a discharging circuit, a plurality of batteries, a relay set for each of said batteries each relay set embodying a plurality of relays mechanically urged in one direction, an electromagnet in each relay set capable of moving said relays in the opposite direction, a solenoid for each relay set and circuit opening and closing devices connected with each of said solenoids said circuit closing devices being arranged to be operated by the release of an electromagnet when a battery is fully charged to energize the electromagnet of the next succeeding relay set.

4. In a battery charging system, a charging circuit, a discharging circuit, a plurality of batteries, a relay set for each of said batteries each relay set embodying a plurality of relays mechanically urged in one direction, an electromagnet in each relay set capable of moving said relays in the opposite direction, a solenoid for each relay set and circuit opening and closing devices connected with each of said solenoids said circuit closing devices being arranged to be operated by the release of an electromagnet when a battery is fully charged to energize the electromagnet of the next succeeding relay set, and to be further energized to move said solenoid and break the circuit to said next succeeding electromagnet as soon as said circuit is closed.

In witness whereof, we hereunto subscribe our names this 21st day of June, A. D. 1923.

JOHN J. RITTER.
JOHN H. RITTER.